April 14, 1925.
P. H. RYLANDER
SEED COTTON CONDITIONER
Filed Jan. 31, 1923
1,533,903
3 Sheets-Sheet 1
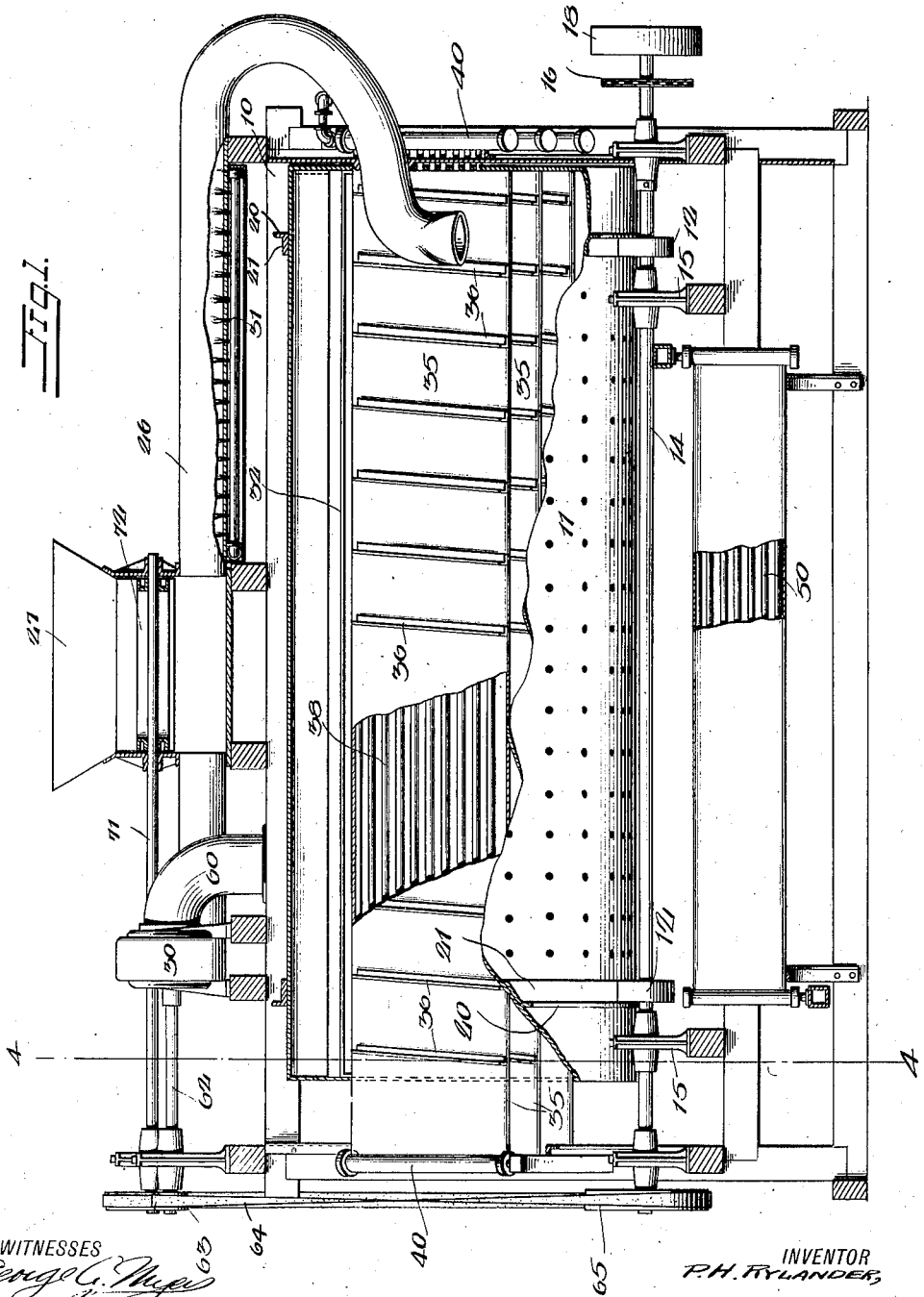

April 14, 1925.
P. H. RYLANDER
SEED COTTON CONDITIONER
Filed Jan. 31, 1923
1,533,903
3 Sheets-Sheet 2
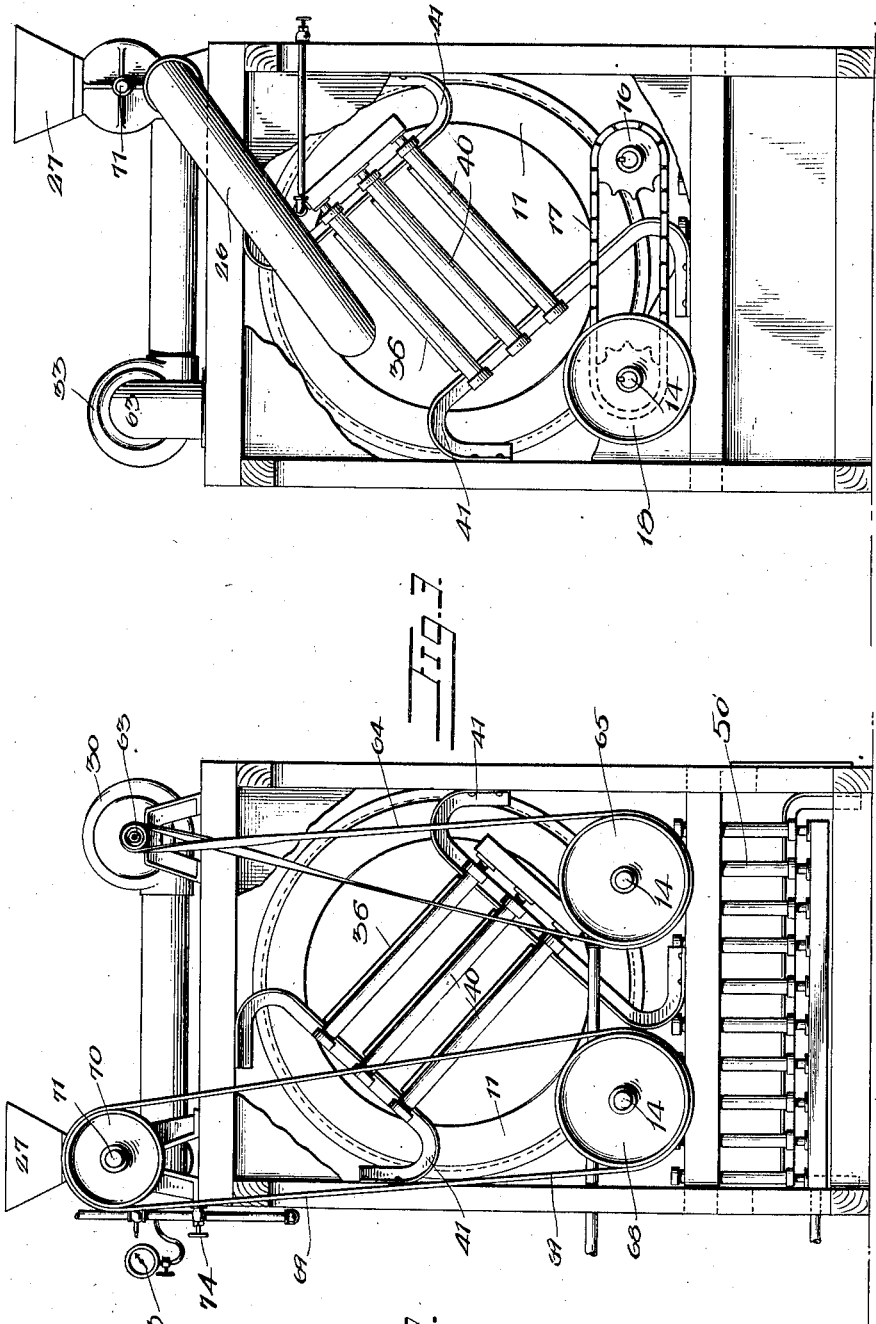

April 14, 1925.
P. H. RYLANDER
1,533,903
SEED COTTON CONDITIONER
Filed Jan. 31, 1923
3 Sheets-Sheet 3
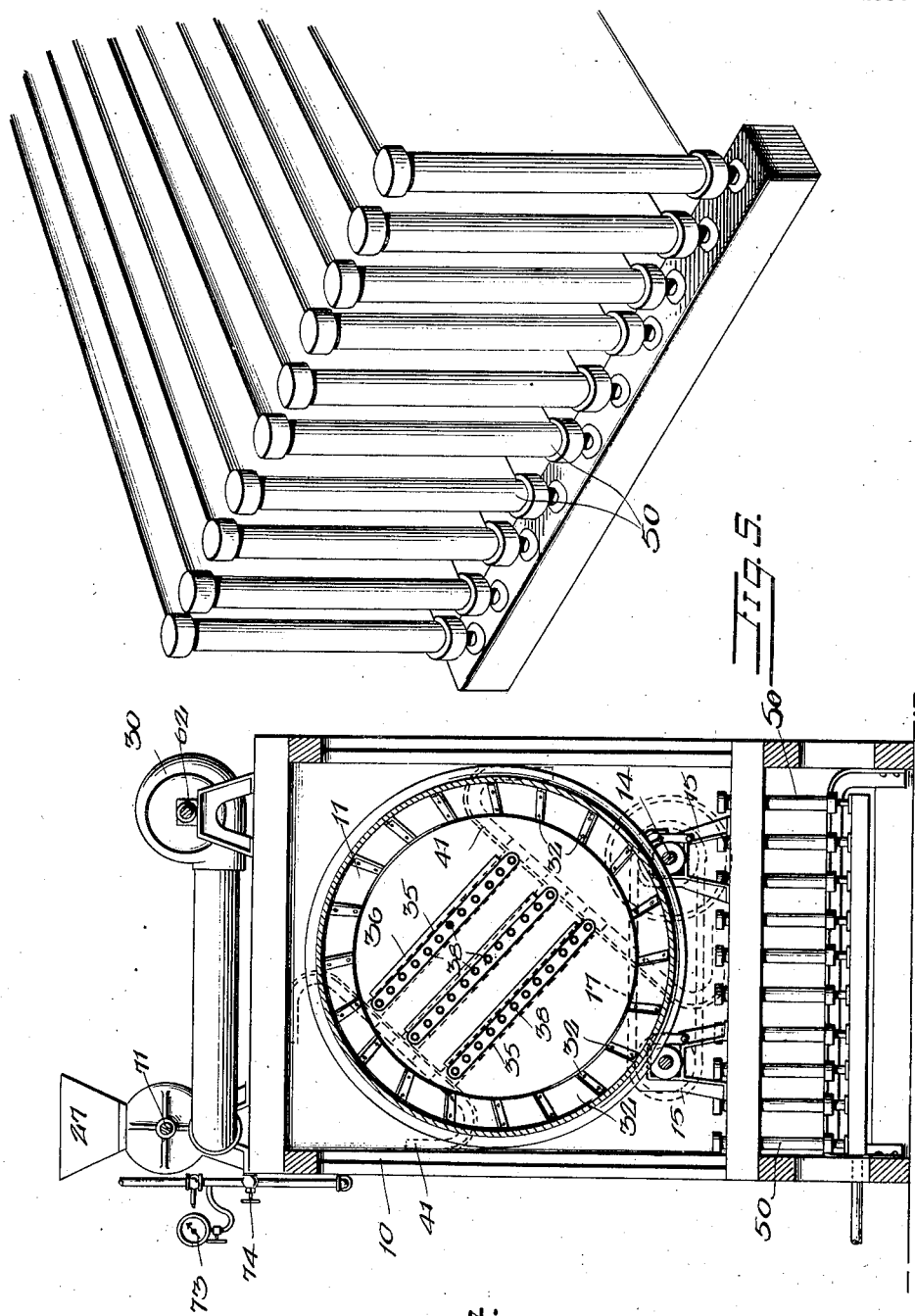

Patented Apr. 14, 1925.

1,533,903

UNITED STATES PATENT OFFICE.

PARRISH H. RYLANDER, OF AUSTIN, TEXAS, ASSIGNOR TO THE RYLANDER CO., OF AUSTIN, TEXAS.

SEED-COTTON CONDITIONER.

Application filed January 31, 1923. Serial No. 616,143.

*To all whom it may concern:*

Be it known that I, PARRISH H. RYLANDER, a citizen of the United States, and resident of Austin, in the county of Travis and State of Texas, have invented certain new and useful Improvements in Seed-Cotton Conditioners, of which the following is a specification.

This invention relates to a machine for conditioning cotton preparatory to ginning the same.

By way of introduction it might be stated that much of the cotton crop is picked or gathered in the field in the early part of the day when the cotton is laden with dew or the rain from a light shower and the cotton is in this condition brought to the gin for immediate ginning. In such condition, that part of the auxiliary machine known as the cleaner can not do efficient work since too much dampness causes the dirt and trash which may be on the cotton, to adhere to it and can not be removed by the apparatus made for cleaning it under dry conditions. Cotton passing through the cleaner wet enters the gin saws wet and immediately clogs them and renders the clogged teeth useless until cleaned. Extra help is demanded to relieve the constantly clogging saws and the plant suffers a material cut in its daily normal capacity which is very expensive.

Further the farmer who brings his cotton to the gin wet gets a diminished turn out, a bad sample of lint, and a much less price on the market. The same farmer picks another bale from the same field under midday conditions, hauls it to the same gin, the same machinery gins it and the cotton will bring five to ten dollars more for the same number of pounds.

The foregoing condition is the result of excessive moisture in the cotton and a more or less similar situation is encountered during a long, hot, dry season. During such a time all the sap and oil of the cotton are dried out and the fiber becomes too brittle for proper ginning, the saws cutting the staple, greatly damaging the quality for good fabrics, thereby reducing the market price of the lint.

In summarizing it is seen that when seed cotton is too wet much lint is left on the seed and is lost to the farmer and when the cotton is too dry the staple suffers damage in the gin saws and the farmer is the loser again. Under both conditions the efficiency of the gin plant is greatly reduced, with resultant additional expense of operation.

Therefore, an important object of this invention is to provide a cotton conditioner having novel means whereby to remove the excessive moisture from the seed cotton to prevent the clogging of the gin saws and consequent loss of lint which the gummed saws fail to remove from the seed.

A further object of the invention is to provide a machine having simple means to relieve the cotton of excessive dryness encountered at various times.

A further object of the invention is to provide a machine which will so condition the seed of seed cotton as to enable the gin saws to perfectly separate all the lint from the seed without the slightest impairment of the normal length and tensile strength of the staple.

A further, and very important, object of the invention is to provide a machine that will take seed cotton which has remained a long time in the field, exposed to all conditions of weather, and which has become faded, stringy and dirty, much of it having fallen on the ground, and restore to such cotton its original rich creamy color, thereby greatly enhancing its value.

A further and equally important object is to kill the pink boll worm which may be in the seed during the conditioning process.

A conditioner constructed in accordance with this invention may if desired, be used as a cotton seed disinfecting machine with a slight modification, but the general adoption of this machine as a cotton conditioner would remove the necessity of sterilization to kill the pink boll worm, as any pink boll worms which are contained in the seeds would be destroyed when passing through the machine during the cotton conditioning process.

A further object is to provide a machine of the character described which is economical to operate, reliable in use and which is capable of greatly increasing the capacity of any gin plant.

Other objects and advantages will be apparent during the course of the following description.

In the accompanying drawings forming a part of this application and in which like numerals are employed to designate like parts throughout the same.

Figure 1 is a vertical sectional view through the improved cotton conditioner.

Figure 2 is an end elevation thereof, parts being broken away.

Figure 3 is an end view of the machine, the view being taken from the end of the machine opposite that illustrated in Figure 2.

Figure 4 is a vertical transverse sectional view taken on line 4—4 of Figure 1.

Figure 5 is a fragmentary perspective of an auxiliary or supplemental heater embodied in the invention.

In the drawing, wherein for the purpose of illustration is shown a preferred embodiment of the invention, the numeral 10 generally designates a casing or chamber formed principally from sheet metal and vertical and horizontal beams or frame members as illustrated. As illustrated in Figure 1 a drum 11 is arranged horizontally within the casing 10 and is mounted upon rollers 12, the rollers in turn being mounted upon longitudinally extending shafts 14. Figures 1 and 3 illustrate that the shafts 14 are supported by bearings 15 and that the shafts are provided with sprocket wheels 16 about which a sprocket chain 17 is trained. One of the shafts 14 is provided with a pulley 18 by means of which the shaft may be connected to a source of power. It is believed to be obvious that the application of power to the wheel 18 will result in the rotation of the two shafts 14 whereby the drum 11 is rotated within the casing to produce the result to be described. Of course the drum 11 is held against longitudinal movement by means of the flanges 20 of the spaced annuli 21 secured about the drum adjacent the ends thereof and forming what might be said to be tracks for the rollers 12. As the flanges 20 engage the outer sides of the rollers or wheels 12 the longitudinal movement of the drum is positively prevented.

Seed cotton is supplied to the drum by means of a flue or connecting member 26 having a hopper 27 into which the cotton is fed. The seed cotton upon being introduced into the hopper is subjected to a constant blast of heated air from a fan 30 and the cotton is made to pass over a series of live steam jets 31 extending longitudinally of the flue 26. However the jets 31 supply steam directly to the cotton only when the cotton is too dry and of course when the cotton is moist beyond the desired degree the steam is not supplied directly to the cotton, but the seed cotton passes through the outlet end of the flue and is discharged into the inlet end of the drum.

Upon being supplied to the inlet end of the drum the cotton is engaged by a plurality of radially arranged longitudinally extending elevator strips 32 secured in any suitable manner to the inside of the drum. The cotton picked up by the elevator strips is discharged onto the upper portion of a series of superposed spaced trays 35 which slidably support the cotton. Figures 2 and 3 illustrate that the trays are inclined transversely so that when the cotton is supplied to the upper edges of the trays it will slide across the same and into the lower portion of the drum. The machine is of course horizontally arranged and consequently the upper sides of the trays 35 are provided with diagonally extending angle bars 36 by means of which the cotton is slightly advanced each time it travels across the trays. The lower portions of the angle bars 36 are preferably set ahead about one inch and consequently the seed cotton will pass across the trays 35 approximately 150 times before passing out into the cleaner.

The cotton is passed across the trays 35 in such manner that it is subjected to the heat from the transversely inclined batteries of coils 38 which are located directly beneath the trays 35. In fact the trays 35 are in the nature of metallic plates or sheets which completely cover the coils 38 and the heat from the coils 38 is transmitted through the sheet metal covers 35 and is brought into contact with the seed cotton as it passes downwardly over the trays.

In carrying out the invention the end portions of the superposed spaced batteries of coils are provided with distributor heads 40 supported by yokes 41 which are in turn secured to the frame work at each end of the machine in the manner illustrated in Figures 2 and 3. Suitable shims may be employed for raising or lowering the several batteries of coils and thereby properly positioning the same.

The drum is formed from sheet metal and has its major portion perforated so that particles of dirt and trash contained in the cotton when fed to the machine may drop through the drum and into the lower portion of the machine. It is thus seen that the machine not only acts as a conditioner for the cotton but also in a measure as a cleaner therefor so as to facilitate the subsequent operations.

Figure 1 illustrates that a series of vertically arranged coils 50 are arranged beneath the drum and in spaced relation to each other and the heat from these coils passes upwardly through the perforations in the drum and cooperates with the heat from the coils 38 in conditioning the cotton.

With reference to Figure 1 it will be observed that the fan 30 draws heated air from the upper portion of the casing by means of a short pipe 60 and as previously stated the air blast created by the fan 30 is employed to advance the cotton through the flue. The hot air passing through the flue and into the drum maintains the drum in a highly heated state and also prevents condensation of the live steam that is shot into the cotton on its way for final treatment. This arrangement creates a continuous circuit of hot air for the purposes set forth and constitutes a new method of moistening seed cotton for proper ginning.

The fan 30 is operated by a shaft 62 having a pulley 63 about which an operating belt 64 is trained. The belt 64 is also trained about an operating pulley 65 on one of the shafts 14 so that the fan is positively operated.

As illustrated in Figure 2 a pulley 68 is mounted on one of the shafts 14 and is provided with a belt 69 trained about a pulley 70 on the shaft 71 of a feed member 72 arranged in the hopper. The movement of the material through the hopper and into the flue is greatly facilitated by the arrangement of the member 72.

In operation the cotton is fed into the hopper 27 and in case the cotton in unusually dry a jet of live steam is supplied thereto during the passage of the cotton through the flue 26. As the cotton passes through the return bend in the outlet end of the flue 26 it is discharged into the drum 11 and the pick up or elevator strips 32 discharge the cotton onto the upper portions of the slide members 35. Figures 2 and 3 plainly illustrate that the upper portions of the trays 35 are arranged in spaced vertical planes so that the material may be freely supplied thereto. That is to say if all the trays had their upper edges arranged in the same vertical plane rather than in spaced vertical planes the material could not be fed thereto conveniently by means of the elevator strips 32. Each time the cotton is fed to the trays 35 the angle bars 36 will advance the cotton in the drum where it is properly conditioned so that the ginning and cleaning operations are greatly facilitated. As previously stated as the cotton moves through the drum 11 trash and dirt therein drop through the perforations in the drum and onto the floor below as the battery of coils or heating elements 50 are arranged in spaced relation. A suitable vacuum or other means may be provided for supplying the conditioned cotton to the cleaner of the gin at the outlet end of the machine.

The steam supply for the coils is under perfect control by the employment of a relief valve 73 mounted on the steam line from the boiler. By such arrangement regardless of steam pressure in the boiler the pressure registered by the reducing valve 73 remains unchanged so long as the pressure of the boiler is above that indicated by the reducing valve. The supply of steam for the jets in the flue 26 is regulated by a needle valve 74. By this arrangement all danger of overheating is removed and the proper conditioning of the seed cotton is made safe and practical.

In case the cotton is sufficiently moist or in case the cotton is too moist the supply of live steam directed to the cotton may be cut off and the passage of the cotton through the machine relieves the cotton of excessive moisture so that the ginning operation will not be accompanied by the difficulty set out in the introduction to this specification.

The steam application to the cotton fiber toughens it so the gin saws can pull it without breaking the same. In the case of wet or damp cotton the heat radiated from the several heating elements and the direct contact of the cotton with the heating trays vaporizes the moisture and this also toughens the fiber to a high degree.

In summarizing it might be stated that this invention resides principally in the use of the inclined trays over which the cotton is passed a plurality of times and is subjected to the high degree of heat to produce the desired results in the smallest possible time thereby bringing about the enhanced value of the lint and the effectual disinfection of the cotton for the killing of the pink boll worm. This construction enables the battery of gins in a ginnery to be operated at full capacity at all times.

Having thus described the invention, what is claimed is:—

1. A cotton conditioner comprising a drum having means whereby the same may be rotated, a plurality of fixed longitudinally extending transversely inclined superposed supporting trays arranged in spaced relation within the drum, and heating elements beneath each of the trays.

2. A cotton conditioner comprising a drum having means whereby the same may be rotated, a plurality of transversely inclined cotton supporting trays arranged in spaced relation within the drum, and a plurality of heating units arranged beneath the several trays for heating the cotton as it passes over the trays, said trays constituting a covering for the several heating elements.

3. A cotton conditioner comprising a drum having means whereby the same may be rotated, transversely inclined cotton supporting trays arranged in superposed spaced relation within the drum, heating units arranged beneath the several trays for heating the cotton as it passes over the trays, said trays constituting a covering for the several heating elements, and elevator strips secured to the inner side of the drum and adapted to supply the cotton to the upper portions of the trays.

4. A cotton conditioner comprising a drum having means whereby the same may be rotated, transversely inclined cotton supporting trays arranged in superposed spaced relation within the drum, heating units arranged beneath the several trays for heating the cotton as it passes over the trays, said trays constituting a covering for the several heating elements, and elevator strips secured to the inner side of the drum and adapted to supply the cotton to the upper portions of the trays, the upper portions of the trays being arranged in spaced vertical planes.

5. A cotton conditioner comprising a drum having means whereby the same may be rotated, cotton supporting trays arranged in superposed spaced relation within the drum, heating units arranged beneath the several trays for heating the cotton as it passes over the trays, said trays constituting a covering for the several heating elements, the upper portions of the trays being arranged in spaced vertical planes, and supplemental means to heat the cotton during its movement through the machine.

6. A cotton conditioner comprising a drum having means whereby the same may be rotated, cotton supporting trays arranged in spaced relation within the drum, a plurality of heating units arranged beneath the several trays for heating the cotton as it passes over the trays, said trays constituting a covering for the several heating elements, elevator means secured to the inner side of the drum and adapted to supply the cotton to the upper portions of the trays, the upper portions of the trays being arranged in spaced vertical planes, said trays having their upper sides formed with spaced diagonally extending strips for advancing the cotton as it passes over the trays.

7. A cotton conditioner comprising a casing, a perforated drum arranged therein, means to rotate the drum about a horizontal axis, a feed hopper having a flue for supplying cotton to the drum, a plurality of stationary spaced coils arranged within the drum and being transversely inclined, the upper edges of the coils being arranged in spaced vertical planes, sheet metal coverings extending over the coils and constituting trays to support the cotton for sliding movement across the coils during which time the cotton is subjected to the action of heat from the coils, and supplemental heating means for the cotton.

8. A cotton conditioner comprising a casing, a perforated drum arranged therein, means to rotate the drum, a feed hopper having a flue for supplying cotton to the drum, a plurality of stationary superposed spaced coils arranged within the drum and being transversely inclined, the upper edges of the coils being arranged in spaced vertical planes, sheet metal coverings extending over the coils and constituting trays to support the cotton for sliding movement across the coils during which time the cotton is subjected to the action of the heat from the coils, supplemental heating means for the cotton, a fan adapted for supplying heated air to the flue whereby to maintain the flue and the drum in a heated condition, said fan having communication with the interior of the casing to receive heated air therefrom.

9. A cotton conditioner comprising a casing, a drum arranged therein, means to rotate the drum, a feed hopper having a flue for supplying cotton to the drum, stationary superposed spaced coils arranged within the drum and being transversely inclined, the upper edges of the coils being arranged in spaced vertical planes, sheet metal coverings extending over the coils and constituting trays to support the cotton for sliding movement across the coils during which time the cotton is subjected to the action of heat from the coils, supplemental heating means for the cotton, a fan adapted for supplying heated air to the flue whereby to maintain the flue and the drum in a heated condition, said fan having communication with the interior of the casing to receive heated air therefrom, said sheet metal covers for said coils being provided with means to advance cotton as it passes across the covers.

10. A cotton conditioner comprising a casing, a drum arranged therein, a feed hopper having a flue for supplying cotton to the drum, a plurality of stationary spaced coils arranged within the drum and being transversely inclined, the upper edges of the coils being arranged in spaced vertical planes, covers extending over the coils and constituting trays to support the cotton for sliding movement across the coils during which time the cotton is subjected to the action of heat from the coils, supplemental heating means for the cotton, a fan adapted for supplying heated air to the flue whereby to maintain the flue and the drum in a heated condition, covers for said coils being provided with means to advance cotton as it passes across the covers, and means to supply jets of steam to the cotton during its passage through the flues.

11. A combined pink boll worm exterminator and cotton conditioner comprising a drum arranged horizontally, means whereby to rotate the drum about a horizontal axis, a plurality of spaced superposed heating coils extending longitudinally through the drum, yokes connected to the coils at the ends thereof and supporting the same, sheet metal covers extending over the coils and being inclined transversely for the passage of cotton, and means carried by the drum whereby to elevate the cotton and supply the same to the upper portions of the coils.

PARRISH H. RYLANDER.